United States Patent
Young

(10) Patent No.: US 6,411,315 B1
(45) Date of Patent: *Jun. 25, 2002

(54) SCALABLE EDIT WINDOW AND DISPLAYABLE POSITION INDICATORS FOR AN ELECTRONIC TYPEWRITER

(75) Inventor: Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/173,021

(22) Filed: Oct. 15, 1998

Related U.S. Application Data

(62) Division of application No. 08/267,503, filed on Jun. 29, 1994, now Pat. No. 5,864,332.

(51) Int. Cl.$^7$ ................................................. G09G 5/34
(52) U.S. Cl. ....................... 345/788; 345/801; 345/472; 400/83; 400/706
(58) Field of Search ................................ 345/781, 783, 345/784, 785, 786, 787, 788, 792, 798, 800, 801, 856, 857, 858, 156, 157, 162, 471, 472; 400/83, 103, 706, 706.1

(56) References Cited

U.S. PATENT DOCUMENTS

| | | | |
|---|---|---|---|
| 3,786,429 A | 1/1974 | Goldman et al. | 340/172.5 |
| 4,016,365 A | 4/1977 | Staar | 178/23 R |
| 4,367,533 A | 1/1983 | Wiener | 364/519 |
| 4,373,194 A | 2/1983 | Demke et al. | 364/900 |
| 4,417,239 A | 11/1983 | Demke et al. | 340/709 |
| 4,428,065 A | 1/1984 | Duvall et al. | 364/900 |
| 4,739,318 A | 4/1988 | Cohen | 340/750 |
| 4,840,499 A | 6/1989 | Sasaki | 400/83 |
| 4,841,478 A | 6/1989 | Takahashi | 364/900 |
| 4,931,987 A | 6/1990 | Kawakami | 364/900 |
| 4,984,162 A | 1/1991 | Torii et al. | 364/518 |
| 5,277,506 A | 1/1994 | Oda | 400/279 |
| 5,864,332 A * | 1/1999 | Young | 345/788 |

FOREIGN PATENT DOCUMENTS

| | | |
|---|---|---|
| EP | 0661649 | 7/1995 |
| JP | 2-160287 | 6/1990 |

OTHER PUBLICATIONS

"Microsoft Word User's Guide", Microsoft Corporation 1993–1994, pp. 230–231 and 512–514.

S. Lambert, et al., "A Quick Course in Word 6 for Windows", 1993, pp. 12 and 25.

* cited by examiner

*Primary Examiner*—Xiao Wu
(74) *Attorney, Agent, or Firm*—Fitzpatrick, Cella, Harper & Scinto

(57) ABSTRACT

A scalable edit window and position indicators displayable on a display of an electronic typewriter are provided. The width of the scalable edit window adjusts in accordance with the paper size or size of the recording medium selected for printing the keyed-in characters, or in accordance with a value provided by the operator. The height of the scalable edit window adjusts in accordance with the font size of keyed-in characters. The keyed-in characters are displayed in the scalable edit window in a font size and appearance as characters which will be printed on a recording medium. The displayable position indicators include a horizontal ruler and a vertical ruler. The horizontal ruler is adjusted in accordance with the maximum printing capability of the system printer or the width of a recording medium used for printing the keyed-in characters. The vertical ruler is adjusted in accordance with the font size of the keyed-in characters or the length of the recording medium. Also included is a scaled image of a recording medium which facilitates operator visualization of the printed document.

68 Claims, 12 Drawing Sheets

SCALABLE EDIT WINDOW AND DISPLAYABLE POSITION INDICATORS FOR AN ELECTRONIC TYPEWRITER

This application is a division of application Ser. No. 08/267,503, filed Jun. 29, 1994, now U.S. Pat. No. 5,864,332.

BACKGROUND OF THE INVENTION

1. Field of the Invention

The present invention relates to a system for displaying keyed-in characters in word processing applications. More particularly, the invention involves a display device for an electronic typewriter which displays a scalable edit window and position indicators for the window, both of which facilitate operator preview of keyed-in characters while providing location information of the characters with respect to a recording medium.

2. Description of the Related Art

Conventional electronic apparatus include some sort of display screen on which keyed-in characters are displayed prior to printing. However, to identify the position at which displayed characters will be printed, it is necessary for the operator to refer to a horizontally-engraved ruler located adjacent the printer carriage, or to a cursor position marker located on the printer head. To perform this task, the operator must, however, switch his/her focus from the display screen, where edit and keying operations are displayed, to the ruler or marker. When several edit operations are necessary, such cross-reference between the display screen and a ruler or marker causes great inconvenience and results in reduced efficiency. In addition, since such conventional rulers or markers only provide horizontal position information, the operator cannot determine the vertical line position or vertical span of the printed characters with respect to the paper.

Thus, there exists a need for a system which displays on a single display device, the spatial relationship of keyed-in characters with respect to the recording medium selected for printing. In particular, there exists a need for a system which provides horizontal and vertical positional information of keyed-in characters, with respect to the recording medium selected for printing the characters, so that the format of the characters on the recording medium may be viewed prior to printing. There also exists a need for a display device which facilitates the display of characters of a variety of font sizes on a single line, including very large font sizes.

In addition, since electronic typewriters generally print each line of characters as soon as keying-in of the characters is complete, the apparatus display screen is usually large enough to display only a single line. Even though markers indicating the horizontal position of the keyed-in characters may be available prior to printing, since only a single line is displayed the operator is generally unable to visualize where on the recording medium the line will be printed. Thus, to visualize the document he/she is formatting, the operator must either print a draft of the document or project an inherently inaccurate mental image of the unprinted document. Inconvenience, delay and inaccuracy are the resulting consequences.

Thus, there exists a need to provide the operator of an electronic apparatus with assistance in visualizing where on a page keyed-in characters will be printed.

SUMMARY OF THE INVENTION

The present invention relates to a system for displaying a scalable edit window and position indicators for the window, both of which facilitate operator preview of keyed-in characters while providing location information of the characters with respect to a recording medium (or paper).

One aspect of the present invention is a system for providing a scalable edit window in which keyed-in characters may be previewed, the edit window having a height adjustable in accordance with font size of the keyed-in characters. A scalable edit window is displayed in accordance with a stored window height, and at least one keyed-in character is displayed in the edit window. The scalable edit window is sized to display a single line of text, and the keyed-in character is displayed in the scalable edit window in a size and font type representative of the corresponding character to be printed. A font size of the keyed-in character is compared to the stored window height. If the font size is larger than the stored window height, the stored window height is replaced with the font size so as to provide an updated window height. The window height of the scalable edit window is adjusted in accordance with the updated window height.

Thus, this aspect of the present invention provides a system which displays on a single display device the spatial relationship of keyed-in characters in a size and font type representative of the corresponding character to be printed. It also facilitates the display of characters of a variety of font sizes mixed together in a single line, including very large and very small font sizes.

Another aspect of the present invention involves a system for providing a scalable edit window in which keyed-in characters may be previewed, the edit window having a width adjustable in accordance with a width of paper on which the characters will be printed. A scalable edit window is displayed in accordance with a stored window width, and at least one keyed-in character is displayed in the edit window. The scalable edit window is sized to display a single line of text, and the character being displayed in the scalable edit window is displayed in a size and font type representative of the corresponding character to be printed. It is then determined if a paper width sensor is present. If present, a paper width value is stored; if not present, a manually-entered paper width value is stored. The stored paper width is compared to a previously-stored window width. If the stored paper width is not the same as the previously-stored window width, the previously-stored window width is updated by replacing it with the newly-stored value so as to provide an updated window width. The window width of the scalable edit window is adjusted in accordance with the updated window width.

This aspect of the present invention provides the operator with a visualization of the spatial relationship of keyed-in characters in a size and font type representative of the corresponding characters to be printed. It also provides a display system which is responsive to the width of the recording medium, so that the operator will be provided with precise location information of keyed-in characters with respect to the recording medium.

A further aspect of the present invention is a system for providing position indicators for a scalable edit window in which keyed-in characters are displayed prior to printing on a recording medium. The position indicators indicate the position of the edit window with respect to the recording medium. A scalable edit window in which keyed-in characters are displayed prior to printing on a recording medium is displayed. A horizontal ruler and a vertical ruler for indicating the position of the edit window with respect to the recording medium are also displayed. The horizontal ruler comprises a left margin marker and a right margin marker which respectively indicate the left and right margins designated for formatting on the recording medium, whereas the vertical ruler comprises a line top marker and a line bottom marker which respectively indicate a top and a bottom of the editing window. A width of paper selected for printing the keyed-in characters is detected. A font size of the keyed-in characters and maximum printing capability of the apparatus are detected. A length of paper selected for printing the keyed-in characters is entered. A left margin value and a right margin value are also entered. The length of the horizontal ruler is adjusted in accordance with the width of the recording medium or in accordance with the detected maximum printing capability of the apparatus. The left margin marker and the right margin marker are also adjusted respectively in accordance with a left margin value and a right margin value. The length of the vertical ruler is adjusted in accordance with the entered length of paper. The line top marker and the line bottom marker are also adjusted in accordance with the detected font size of the keyed-in characters. The keyed-in characters are then printed.

This aspect of the present invention provides the operator with the spatial relationship of keyed-in characters with respect to the recording medium selected for printing. More specifically, horizontal and vertical position information of keyed-in characters are provided so that the format and position of characters on the recording medium may be previewed prior to printing.

Yet another aspect of the present invention involves a system for displaying a scaled image of a recording medium on which is indicated a position for pending print operations. A line of keyed-in characters is displayed in a first display area prior to printing on a recording medium. Size information for the recording medium and position information indicative of the pending print position for the keyed-in characters displayed in the first display area are stored. A scaled image of the recording medium is displayed in a second display area, which is preferably on the same screen as the first display area. The pending print position of the line of keyed-in characters displayed in the first display area is visually highlighted on the scaled image in the second display area in accordance with the stored position information.

This aspect of the present invention provides the operator of an electronic typewriter with assistance in visualizing where on a page keyed-in characters will be printed.

DETAILED DESCRIPTION OF THE PREFERRED EMBODIMENT

Figure 1:
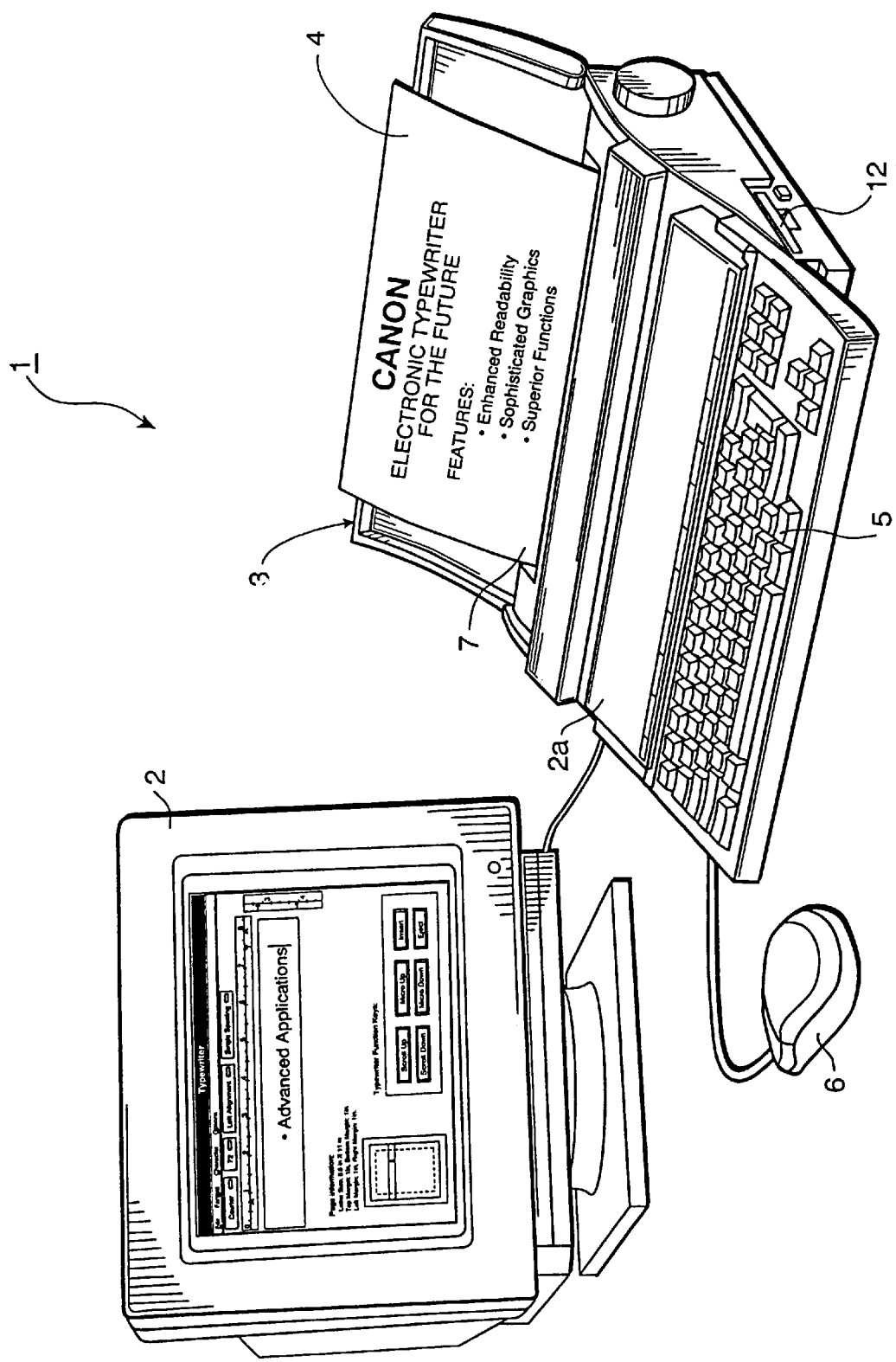
FIG. 1 is a perspective view of the external appearance of a preferred embodiment of the electronic typewriter of the present invention.

FIG. 1 shows a perspective view of a preferred embodiment of the electronic typewriter system 1 of the present invention. The electronic typewriter system 1 provides format and size information of keyed-in characters on a display prior to printing the displayed text. The electronic typewriter system 1 also provides precise location information of keyed-in characters with respect to a recording medium on which the characters are to be printed.

The electronic typewriter system 1 comprises display means 2 such as CRT monitor, an electronic typewriter 3, keyboard 5 and an integral printer 7 for printing on a recording medium such as paper 4. The electronic typewriter system 1 may optionally include a mouse 6.

The display means 2 displays keyed-in characters entered by the operator via keyboard 5. In a preferred embodiment, the display means 2 is a CRT monitor with a 14-inch, 15-inch or 17-inch screen. In an alternate embodiment, the display means 2 is a liquid crystal display (LCD) screen integrally mounted above the keyboard, such as in area 2a. The display means 2 permits the operator to preview the characters as they would appear when printed on a recording medium. The structure and manner of previewing characters on display means 2 will be discussed in greater detail below.

The keyboard 5 comprises a plurality of keys which facilitate operator input of textual information, such as alphanumeric characters. In an alternate embodiment, textual information may be entered by either voice recognition devices or an input device which recognizes handwritten data, or by reading a computerized disk file on floppy disk drive 12. The keyboard 5 further comprises a plurality of function keys including a backspace key, a return key and a space key. The function keys also include keys for selecting the printing mode and the font style of characters to be printed. The electronic typewriter system 1 stores these input characters in random access memory (RAM) pending printout by printer 7 on the recording medium.

The integral printer 7 prints out characters entered via keyboard 5 as stored in RAM. In an alternate embodiment, the electronic typewriter system 1 is connected to a separate printer.

Figure 2:
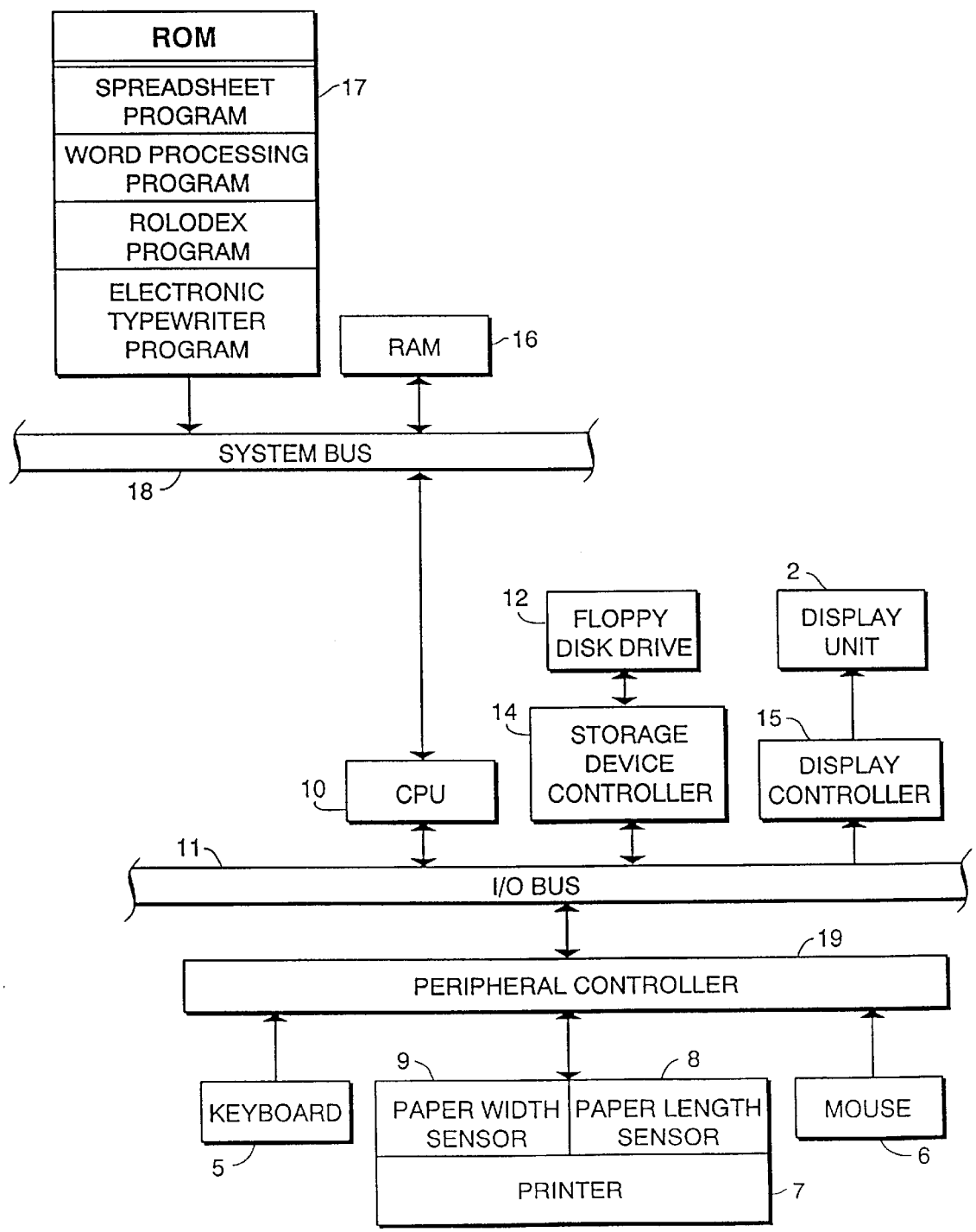
FIG. 2 is a block diagram depicting structural elements within the electronic typewriter of FIG. 1.

FIG. 2 depicts a block diagram illustrating the internal control and processing components of electronic typewriter system 1. As shown in FIG. 2, the electronic typewriter system 1 comprises a central processing unit (CPU) 10 such as an Intel 80286 or similar processor. As described earlier, the electronic typewriter system 1 also comprises a plurality of peripheral devices, such as a keyboard 5, mouse 6 and printer 7, which are in communication with the CPU 10 via peripheral controller 19. The peripheral controller 19 is connected to Input/Output (I/O) bus 11 which is in turn connected to the CPU 10. In the present embodiment, the I/O bus 11 connects to a storage device such as floppy disk drive 12 via a storage device controller 14. Similarly, the I/O bus 11 connects to a display unit 2 through a display controller 15.

Printer 7 may include a paper-length sensor 8 and a paper-width sensor 9, both of which also communicate with the CPU 10 via Input/Output bus 11.

A read only memory (ROM) 17 interfaces with system bus 18 to provide the CPU 10 with specialized and variant functions such as a start-up program and Basic Input Output System (BIOS) programs. ROM 17 also provides the CPU 10 with storage for its operating system (preferably a windowing operating system such as Microsoft Windows or GEOS by GeoWorks), as well as storage for several application programs, each of which provides electronic typewriter system 1 with different capabilities, such as word processing, spreadsheet, Rolodex and electronic typewriter applications, as will be discussed in detail in the following sections.

To execute stored program instruction sequences for the start-up program, BIOS programs or application programs, CPU 10 loads program instruction sequences of a specific program from the ROM 17 and executes those sequences, such as in response to word processing, spreadsheet, Rolodex and electronic typewriter applications. A random access memory (RAM) 16, which is also connected to CPU 10 via system bus 18, provides the CPU 10 with data storage such as storage for keyed-in characters.

In addition to storing process steps for controlling the operation of electronic typewriter system 1 and the applications program, the ROM 17 also stores font data for "What-You-See [on the monitor]-Is-What-You-Get [in the printed document]" (WYSIWYG) software. The WYSIWYG software permits keyed-in characters to be displayed on display means 2 in the same format, size and appearance as they are printed.

In a further embodiment, additional application programs such as user-purchased application programs not loaded on ROM 17 may be loaded in floppy disk drive 12 and run by the system 1.

Though not shown in FIG. 2, the electronic typewriter system 1 may also be provided with a network interface such as Ethernet or a token ring, which would provide networking capabilities, for example, to a local area network (LAN) or a wide area network (WAN).

Figure 3:
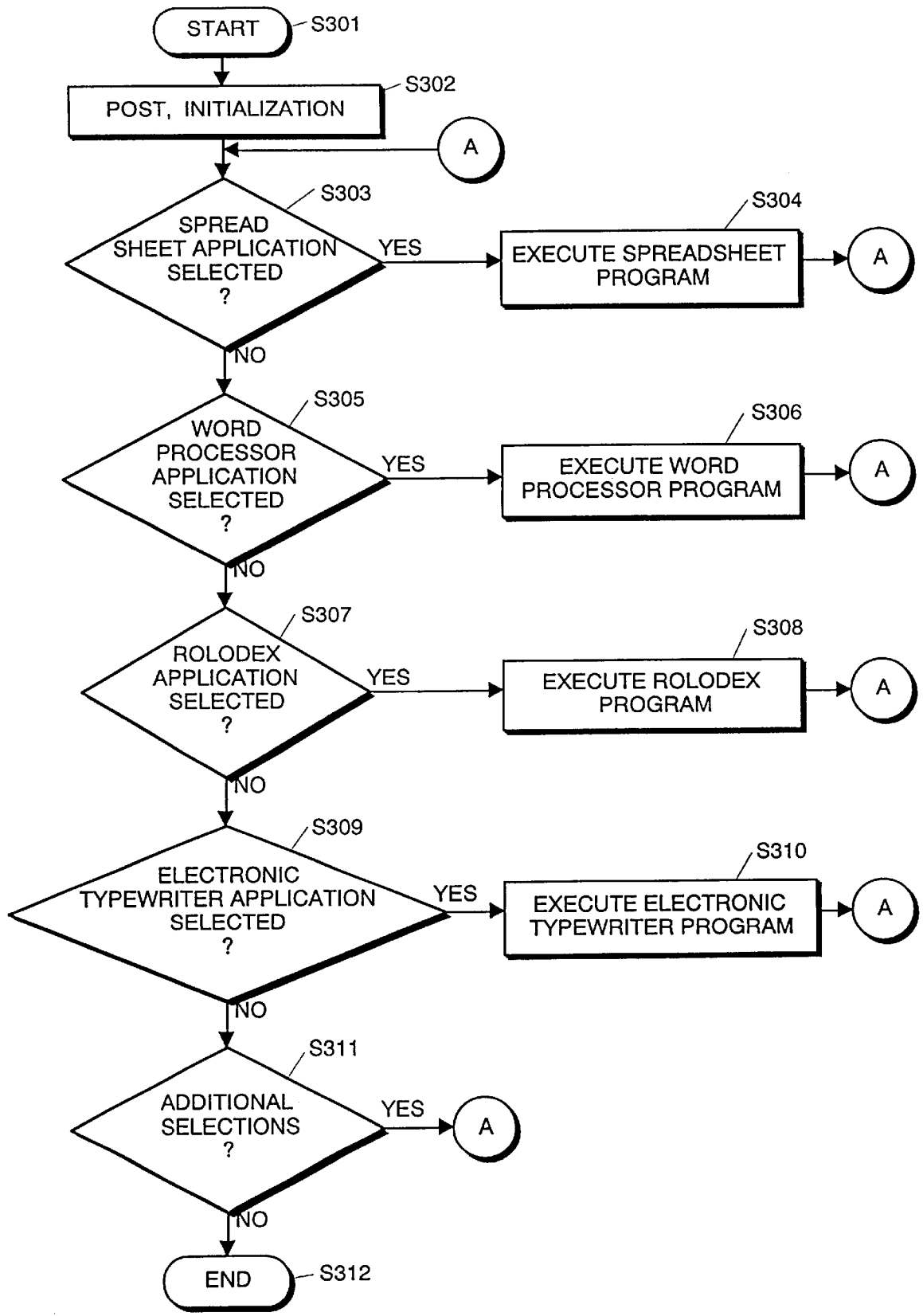
FIG. 3 is a flow chart which illustrates the procedure for selecting the application programs used in the method of the present invention.

FIG. 3 is an operational flow chart showing the selection and application of software used in the method of the present invention. Upon power-up, as indicated by a start state S301, the electronic typewriter system 1 proceeds to perform a Power-On Self-Test (POST) and initialization procedures as shown in step S302. Once initialized, the electronic typewriter system 1 allows the operator to select any one of the available operational modes corresponding to the application programs in ROM 17. Thus, as shown in step S302, the system 1 queries if a spreadsheet mode is desired. If the operator selects the spreadsheet mode, as shown in step S303, CPU 10 retrieves and executes program instruction sequences for the spreadsheet program from ROM 17, as shown in step S304.

In a preferred embodiment, a menu presenting a listing of various spreadsheet programs is displayed prior to the retrieval and execution processes. The operator may select to utilize any one of a number of conventional spreadsheet programs presented on the menu. Typical examples include BigCalc from GeoWorks, Excel (Version Five) from Microsoft, Lotus 123 and Quattro Pro from Borland.

Upon completion of the spreadsheet program, the system 1 returns to step S303 to present further opportunity for program selection by the operator.

In one embodiment, word processing programs such as Geoworks' GeoWrite, WordPerfect for Windows, Microsoft's Word for Windows and Lotus' AmiPro for Windows, are presented. In another embodiment, a custom-written word processing program may be used.

Upon completion of the word processing program, the electronic typewriter system 1 returns to step S303 for operator selection of available programs.

If the operator selects to operate the Rolodex mode (step S307), the CPU 10 retrieves and executes the program instruction sequences for the Rolodex program from ROM 17, as shown in step S308. In one embodiment, a menu illustrating a number of conventional Rolodex programs, such as GeoWorks' GeoDex, Microsoft's Personal Organizer program, is presented prior to the retrieval and execution processes. In another embodiment, custom-written Rolodex programs may be presented to the operator.

Upon completion of the Rolodex application, system 1 returns to step S303 for further inquiries.

Figure 6:
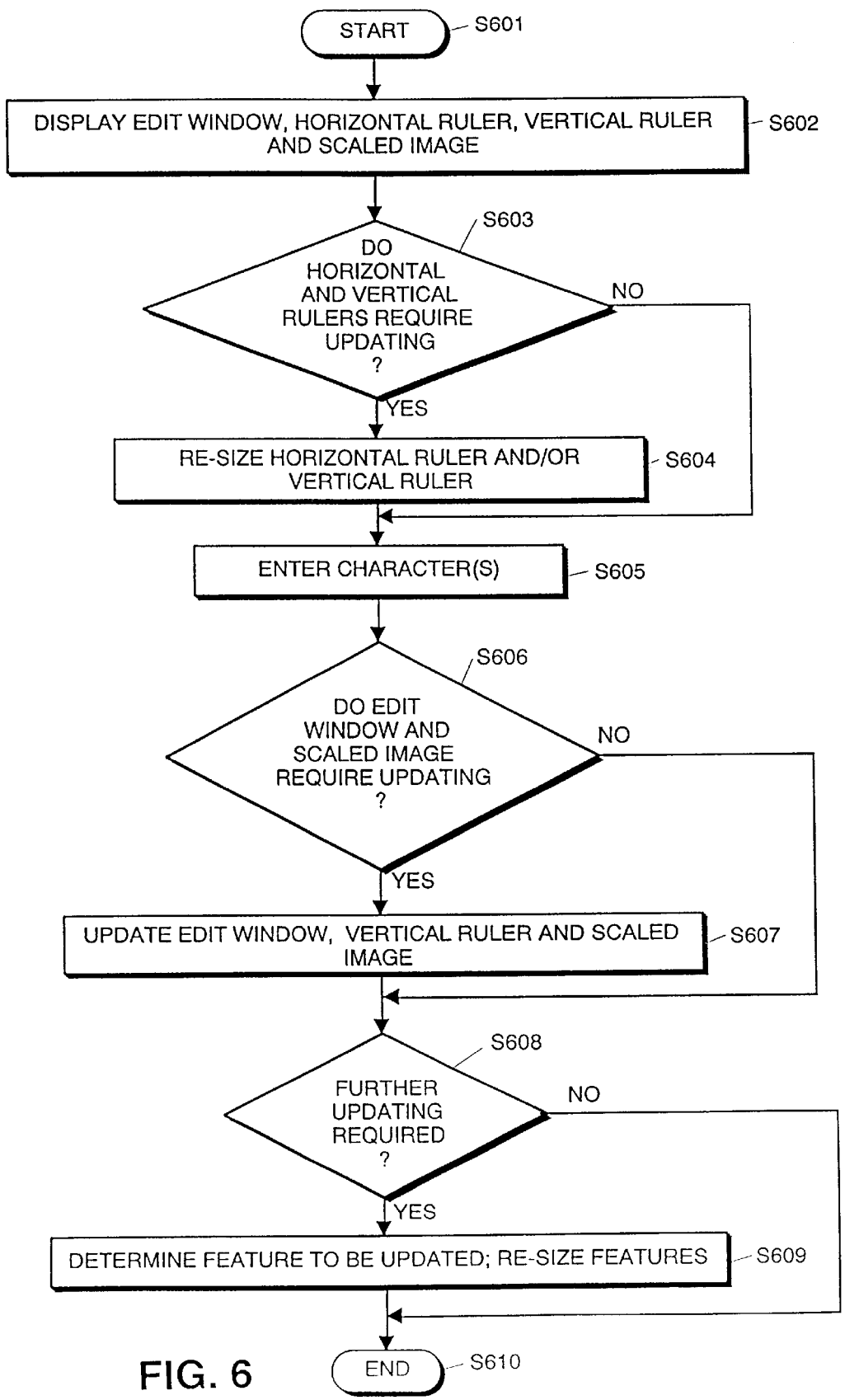
FIG. 6 is a flow chart which outlines the general operational flow of the method of the present invention.

If the operator selects the electronic typewriter mode, CPU 10 retrieves and executes the program instruction sequences for the electronic typewriter program from ROM 17, as shown in step S310. In a preferred embodiment, a custom-written electronic typewriter program, such as that illustrated in the flow chart of FIG. 6, is presented. Advantageously, a menu depicting a number of other conventional electronic typewriter programs may also be presented prior to the retrieval and execution processes.

Upon completion of the electronic typewriter program, the system 1 returns to step S303, where it prompts the operator to select another program.

Other selections or applications may be provided, as shown in step S311.

Selection of the above-mentioned applications may also be facilitated by way of a menu generated by CPU 10 and displayed on display means 2.

Figure 4:
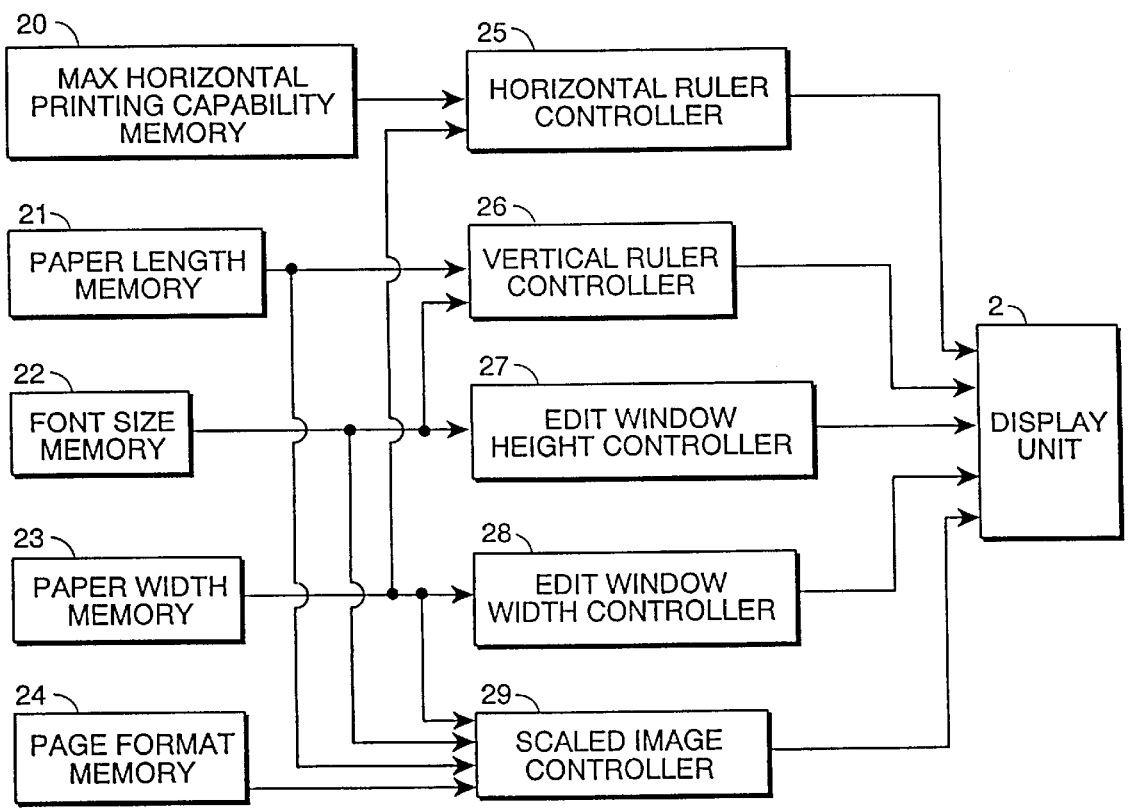
FIG. 4 is a detailed functional block diagram depicting various functional elements within the electronic typewriter of FIG. 1.

FIG. 4 is a detailed functional block diagram depicting various functional elements which control edit window functions within the electronic typewriter system 1 of the present invention.

Memory 20, which is a predesignated memory location in RAM 16, stores a value representing the maximum possible horizontal printing capability of printer 7. In the present preferred embodiment, a sensor (not shown) senses the maximum horizontal printing. In an alternate embodiment, this capability is preset. In a further embodiment, the system 1 prompts the user to enter this value. Whatever its source, the value representing the maximum horizontal printing capability of the printer 7 is then stored in maximum horizontal printing capability memory 20.

Paper width memory 23 stores a value representing the width of the recording medium, as detected by paper-width sensor 9 from the paper inserted in printer 7. Alternatively, the system 1 prompts the user to enter this value. This detected or entered value is stored in paper-width memory 23. Based on the value stored in printing capability memory 20 or the value stored in paper-width memory 23, a horizontal ruler controller 25 controls how a horizontal ruler is displayed on display means 2.

Similarly, the paper-length sensor 8 detects the length of the paper inserted into the printer 7 and this value is stored in paper-length memory 21 in RAM 16. In an alternate embodiment, the system 1 prompts the user to enter this value. Based on this value, a vertical ruler controller 26 controls how a vertical ruler is displayed on display means 2. The vertical ruler controller 26 also monitors the font sizes of keyed-in characters. Where a change in font size is detected, the value of the new font size is stored in font-size memory 22. The value stored in font-size memory 22 is also used by the vertical ruler controller 26 to control how the vertical ruler is displayed on display means 2.

The value stored in font-size memory 22 is also monitored by an edit window height controller 27 in CPU 10. Based on this value, the edit window height controller 27 controls how the height of the edit window 30 is displayed on display means 2.

The value stored in paper-width memory 23 is also monitored by an edit window width controller 28. Based on this value, the edit window width controller 28 re-sizes the width of the edit window 30, and sends a command to the display means 2 to display the width of the re-sized edit window 30.

A scaled image controller 29 in CPU 10 also monitors the left, right, top and bottom margin locations for the document presently being edited. In a preferred embodiment, the system 1 prompts the user to enter these values. In an alternate embodiment, these values are preset. The values representing the left, right, top and bottom margin locations are stored in a page format memory 24 stored in RAM 16. The value stored in the page format memory 24 and the values stored in the paper-length memory 21, the font-size memory 22, and the paper-width memory 23 are used by the scaled image controller 29 in CPU 10 to control how a scaled image of the recording medium is displayed on display means 2.

In a preferred embodiment, the scaled image controller 29 also monitors the position of a cursor in the edit window which indicates the position where the next keyed-in characters will be displayed. The value representing this cursor position is stored in a cursor position memory (not shown) and is used by the scaled image controller 29 to control highlighting in the scaled image, as described below in connection with FIG. 5. In another preferred embodiment, the value stored in the cursor position memory is also used by the horizontal ruler controller 25 to control how a cursor marker (39 in FIG. 5) is displayed on display means 2.

Figure 5:
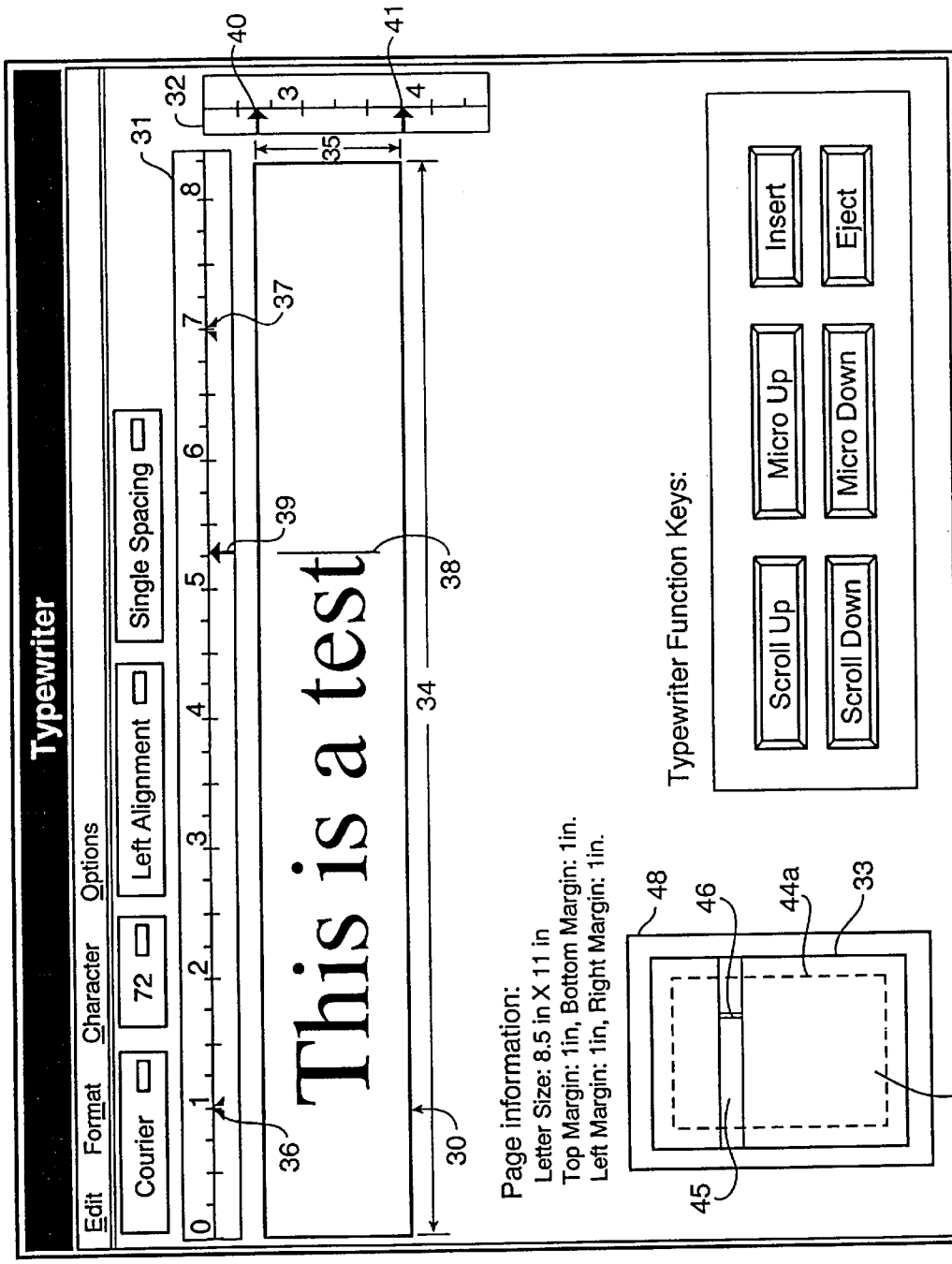
FIG. 5 illustrates a preferred embodiment of the scalable edit window, the horizontal ruler, the vertical ruler and the scaled image of a recording medium of the present invention as displayed on a monitor screen.

FIG. 5 illustrates a preferred embodiment of a scalable edit window 30, a horizontal ruler 31, a vertical ruler 32 and a scaled image 33 as presented on the screen of display means 2.

The scalable edit window 30 has a width 34 which is substantially the same width as the paper currently being used with the electronic typewriter, and a height 35 which is substantially the same height or font size as one line of displayed characters. The scalable edit window 30 displays keyed-in characters, as will be discussed in greater detail in the following sections. In an alternate embodiment, the width of edit window 30 is constrained by the maximum printing capability of printer 7.

In a further embodiment, the scalable edit window 30 is scrollable in a horizontal direction. For example, where a display screen limits the display of the entire line of keyed-in characters, the edit window width controller 28 scrolls the edit window horizontally, as each character beyond the horizontal span of the display screen is entered. This feature enables all keyed-in characters to be previewed by the operator. The edit window 30 also displays a cursor 38 in a position which indicates where the next character will appear (or will be edited).

The horizontal ruler 31 has a width which varies in accordance with the paper width and the vertical ruler 32 has a height which varies in accordance with the current character font size. Both the horizontal and the vertical rulers 31, 32 have markers which indicate the horizontal and vertical positions of the line to be printed. In the case of the horizontal ruler 31, the markers are left and right margin markers 36, 37 which together indicate the horizontal boundaries within which the displayed characters will be printed. In addition, the horizontal ruler 31 has a cursor marker 39 which indicates the horizontal position of the final displayed character. In the case of the vertical ruler 32, the markers are line top marker 40 and line bottom marker 41 which together indicate the vertical boundaries of the edit window 30. The line top marker 40 and line bottom marker 41 also indicate the vertical boundaries within which the characters currently displayed will be printed. The vertical ruler 32 also has a top margin marker (not shown) and a bottom margin marker (not shown) which together indicate the vertical margins of the recording medium.

Scaled image 33 is a representational image of the recording medium on which keyed-in characters will be printed. The scaled image 33 is positioned in a second display area 34 on the same screen in which edit window 30 is displayed in a first area. The scaled image has a length and a width respectively representative of the length and width of the actual paper currently inserted in the printer. Positioned on the scaled image 33 is an editable zone 44, a current editing line 45, and a cursor 46. The border of editable zone 44 is visually shown as a dotted line 44a representative of the left margin, the right margin, the top margin and the bottom margin of the recording medium. A highlighted area 45 superimposed on the editable zone 44 represents the position on the recording medium that window 30 corresponds to. A darker highlighted area 46 superimposed on area 45 represents the width of the next editing character in the edit window 30. This area 46 is positioned beginning at a position corresponding to the position of cursor 38 in scalable edit window 30.

Upon selection of the electronic typewriter mode in decision step S309, the program instruction sequences for the electronic typewriter program are fetched from main memory and executed. Upon executing these program instruction sequences, the screen display comprising the scalable edit window 30, the horizontal ruler 31, the vertical ruler 32 and the scaled image 33 are displayed.

FIG. 6 is a flow chart which outlines the overall operational flow of a method according to the present invention, as represented by electronic typewriter operation (step S310 in FIG. 3). Upon selecting the use of the electronic typewriter application, the process steps shown in FIG. 6 are executed. More specifically, step S602 displays the scalable edit window 30, the horizontal ruler 31, the vertical ruler 32 and the scaled image 33 of the present invention in accordance with default values. In a preferred embodiment, the horizontal ruler 31 has a maximum default value of 9 inches, the vertical ruler has a maximum default value of 18 inches, the height of the edit window has a default value of 12 points and the width of the edit window has a default value of 8½ inches.

The edit window 30, the horizontal ruler 31, the vertical ruler 32 and the scaled image 33 then are updated in accordance with newly-detected parameters. More particularly, step S603 determines if the horizontal and vertical rulers 31, 32 require updating, as will be discussed in detail in the following sections. If the horizontal ruler controller 25 determines that the horizontal ruler 31 requires updating, flow advances to step S604, where the horizontal ruler 31 is re-sized. Similarly, if the vertical ruler controller 26 determines that the vertical ruler 32 requires updating, flow advances to step S604, where the vertical ruler 32 is re-sized. Control is then passed to step S605. If it is determined that the horizontal and vertical rulers 31, 32 do not require updating, flow proceeds directly from step S603 to step S605.

In step S605, the user is prompted to key in a character or a sequence of characters. The user may also edit displayed characters. As each character is keyed in, it is displayed in edit window 30. When a character has been entered, flow advances to decision step S606, where the edit window height controller 27 and the edit window width controller 28 determine if the edit window 30 requires updating and the scaled image controller 29 determines if scaled image 33 requires updating, as will be described in greater detail in the following sections. If so, flow advances to step S607, where the edit window height controller 27 and the edit window width controller 28 respectively re-size the edit window 30 and the scaled image 33. As described earlier, if re-sizing of the edit window 30 is due to changes in font sizes of keyed-in characters, the vertical ruler controller 26 will also re-size the vertical ruler 32. Control is then passed to decision step S608. If the edit window and the scaled image do not require updating, flow proceeds directly to decision step S608.

Step S608 checks if further features require re-sizing. For example, the cursor marker 39 on the horizontal ruler 31 may have to be repositioned. If so, the process determines the feature to be updated and updates that feature accordingly, as shown in step S609. If not, flow proceeds directly to step S610, where the process is terminated.

Figure 7:
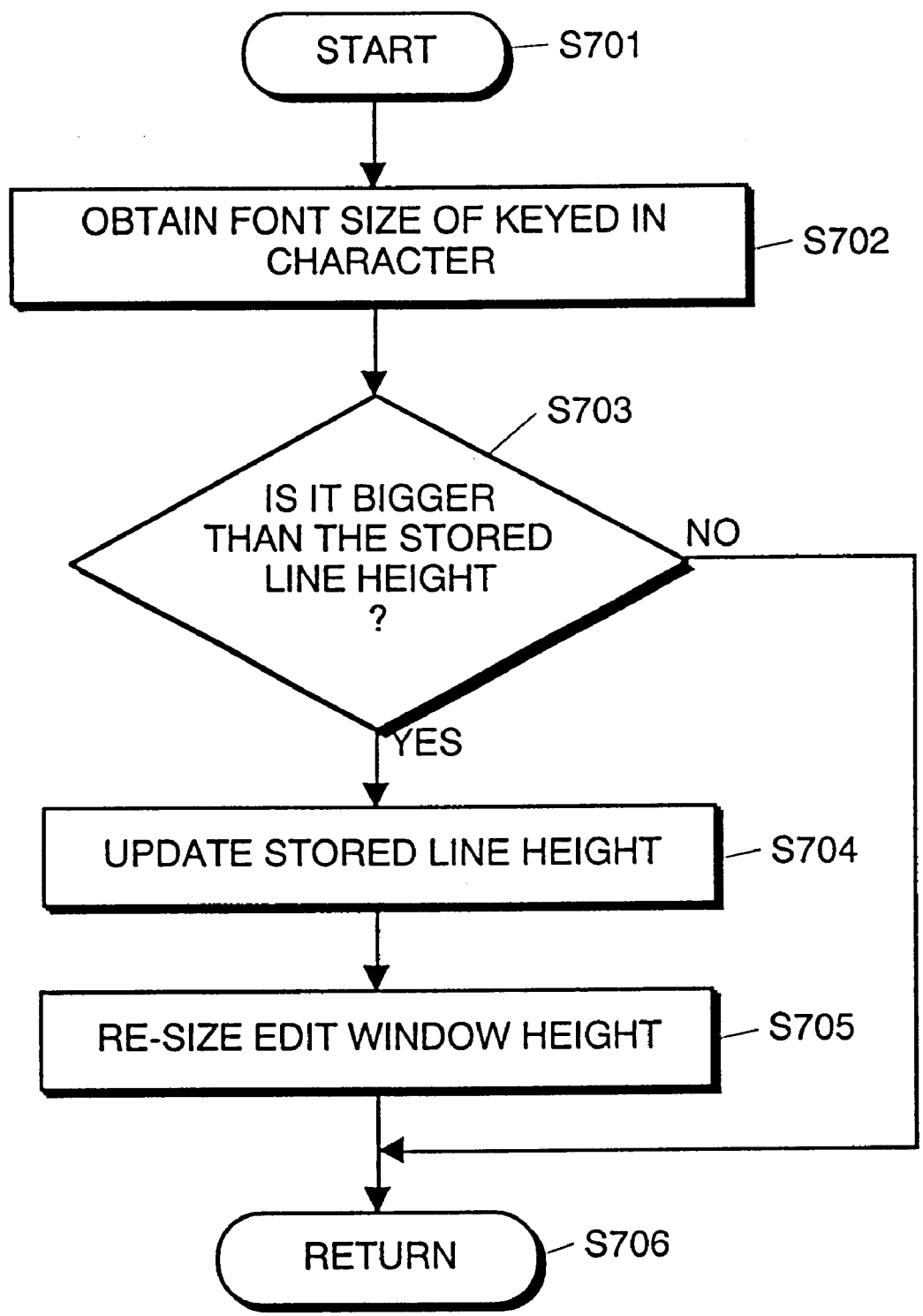
FIG. 7 is a flow diagram of the process steps for updating the height of the edit window.

FIG. 7 is a flow diagram which illustrates in further detail the process in step S602 for updating the height 35 of the edit window 30. Beginning with a start state S701, as controlled by edit window height controller 27 of CPU 10, flow proceeds to step S702 which obtains the font size of the keyed-in character from font-size memory 22 of RAM 16.

Figure 8:
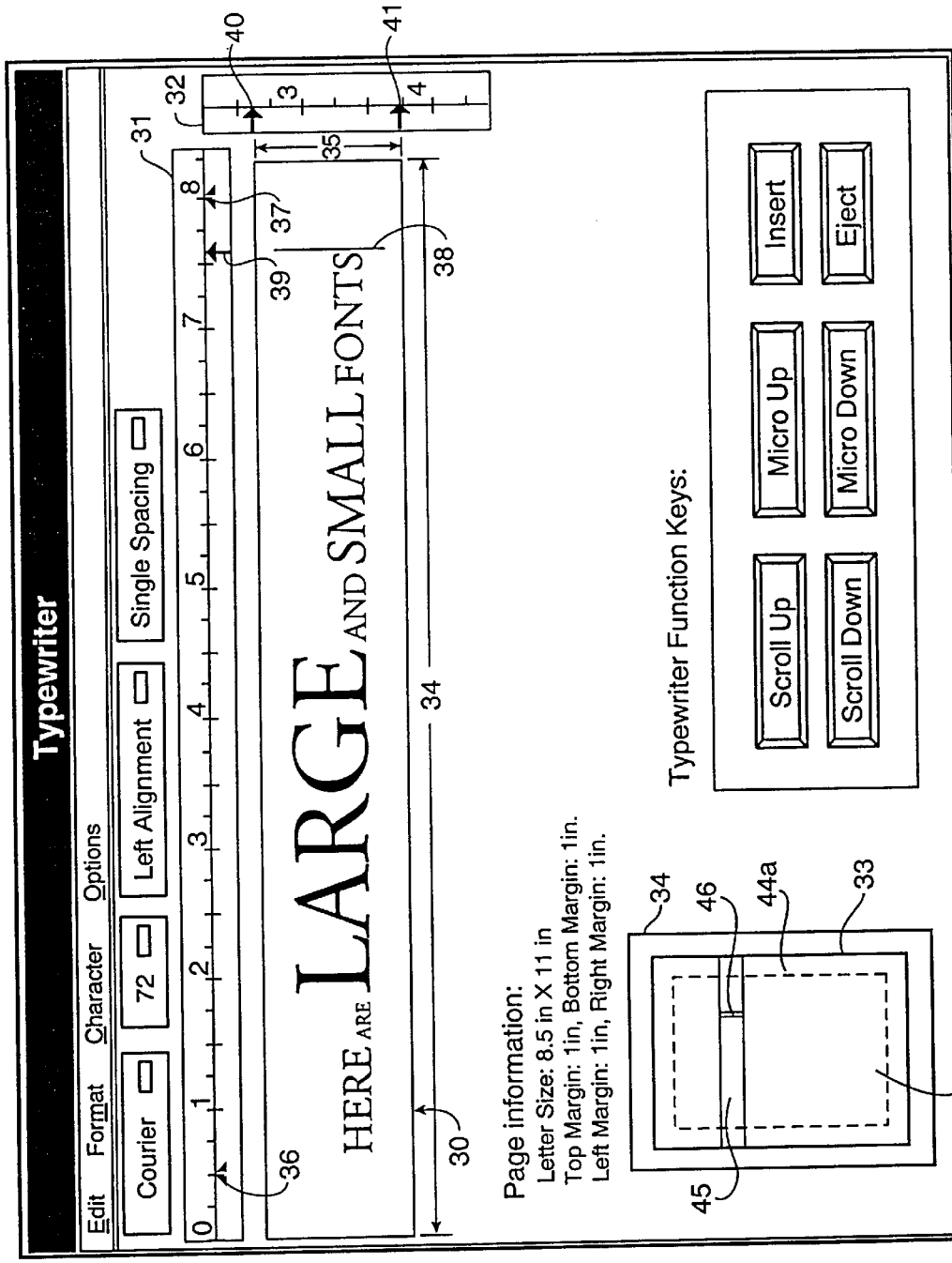
FIG. 8 illustrates an alternate embodiment of the screen display used for previewing keyed-in characters.

As illustrated in FIG. 8, the height 35 of the edit window is as high as the largest font size of the keyed-in character on a single line displayed in the edit window 30. In a preferred embodiment, the edit window 30 may accommodate characters with a font size of 72 points. In an alternate embodiment, the height 35 of the edit window 30 may be preset.

Step S703 inquires if the font size of the keyed-in character is larger than a stored line height. If so, flow proceeds to step S704, where the edit window height controller 27 updates the stored line height and replaces the stored line height with the new font size. Flow then proceeds to step S705, where the edit window height controller 27 re-sizes the edit window 30. At this juncture, the edit window height controller 27 modifies the height 35 of the edit window in accordance with the newly-defined line height. Flow then proceeds to step S706, where the edit window height controller 27 returns control to the main process flow as depicted in FIG. 3. If the stored line height is the same as or smaller than the newly-entered font size, flow directly proceeds to return to the main process flow as depicted in FIG. 3.

Figure 9:
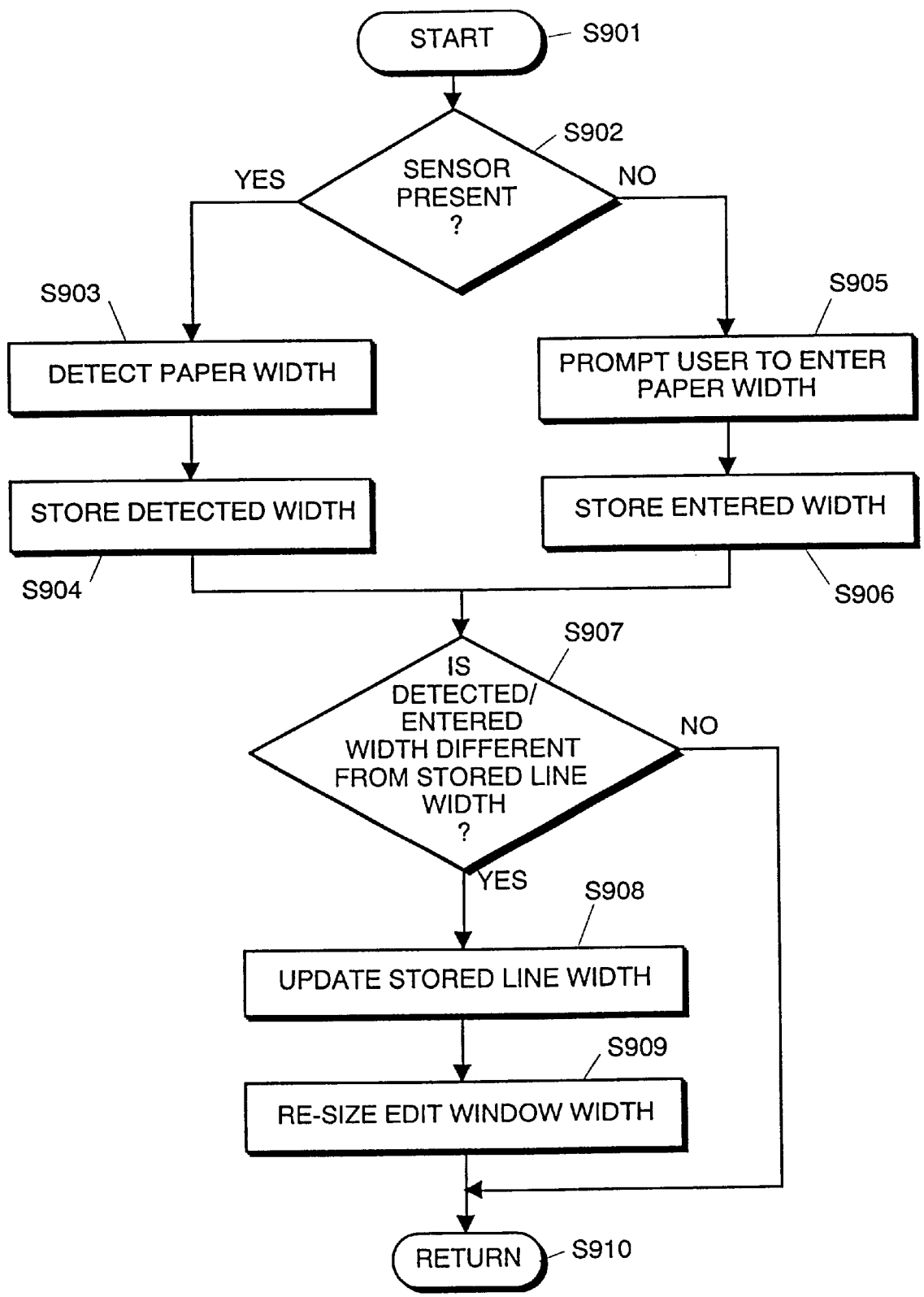
FIG. 9 is a flow diagram of the process steps for updating the width of the edit window.

FIG. 9 is a flow diagram which depicts in greater detail the process in step S602 for updating the width 34 of the edit window 30. Beginning with a start state S901, as controlled by edit window width controller 28 of CPU 10, flow proceeds to decision step S902 which determines if a paper-width sensor exists. If so, flow proceeds to step S903, where the paper-width sensor 9 of CPU 10 detects the horizontal paper edge locations of an inserted recording medium such as paper. In step S904, the paper-width sensor 9 stores the detected width in paper-width memory 23. Paper width is calculated and the left and right margin markers 36, 37 are positioned. Flow then proceeds to the decision step S907.

If step S902 determines that a paper-width sensor does not exist, flow proceeds to step S905, where CPU 10 prompts the user to enter the paper width as well as the locations of the left, right, top and bottom margins. In step S906, CPU 10 stores the entered width in memory 23. At this juncture, the edit area enclosed by the left and right margin markers 36, 37 is centered on the horizontal ruler 31. The left and right margin markers 36, 37 are also positioned. Flow then proceeds to decision step S907.

Step S907 determines if the detected or entered paper width is different from a stored line width. If so, in step S908, the edit window width controller 28 updates the stored line width. Then, in step S909, the edit window width controller 28 scales and re-sizes the window width 34. Flow is then terminated at step S910.

If the stored line width is not different from the current line width, flow proceeds directly to terminate at step S910.

Figure 10:
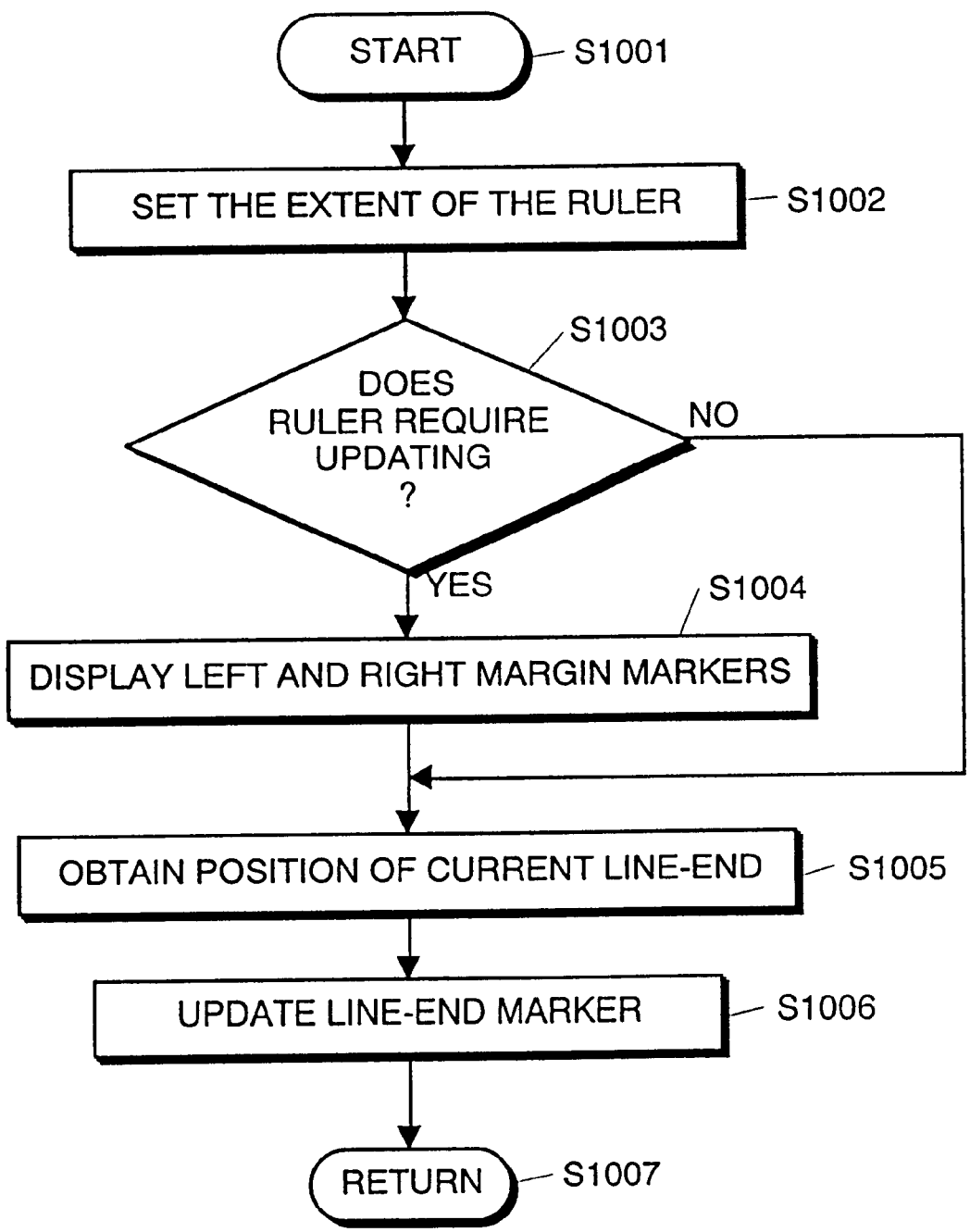
FIG. 10 is a flow diagram of the process steps for updating the length of the horizontal ruler.

FIG. 10 is a flow diagram which depicts in further detail the process in step S604 for updating the horizontal ruler 31. Beginning with a start state S1001, the process as controlled by horizontal ruler controller 25 of CPU 10 advances to step S1002 which sets the limit of the ruler 31 based on the maximum horizontal printing capability of the system.

Flow next proceeds to decision step S1003, where the horizontal ruler controller 25 examines if a request has been sent to update the ruler 31. The horizontal ruler controller 25 conducts this inquiry by referring to paper width memory 23 in RAM 16. As described earlier, the edit window 30 is re-sized if a recording medium with a different width from a stored value is detected, or if a new width value is entered by the user. If a request has been sent to re-size the ruler 31, flow proceeds to step S1006, where the horizontal ruler controller 25 positions the left margin marker 36 and the right margin marker 37 based on the value of the paper width retrieved. If not, flow proceeds to step S1005, where the horizontal ruler controller 25 obtains the location of the end of the current editing line. Flow then proceeds to step S1006, where the horizontal ruler controller 25 updates the cursor marker 39 (the positions of cursor 38 and highlighted area 46 are updated appropriately), after which the flow terminates at step S1007.

Figure 11:
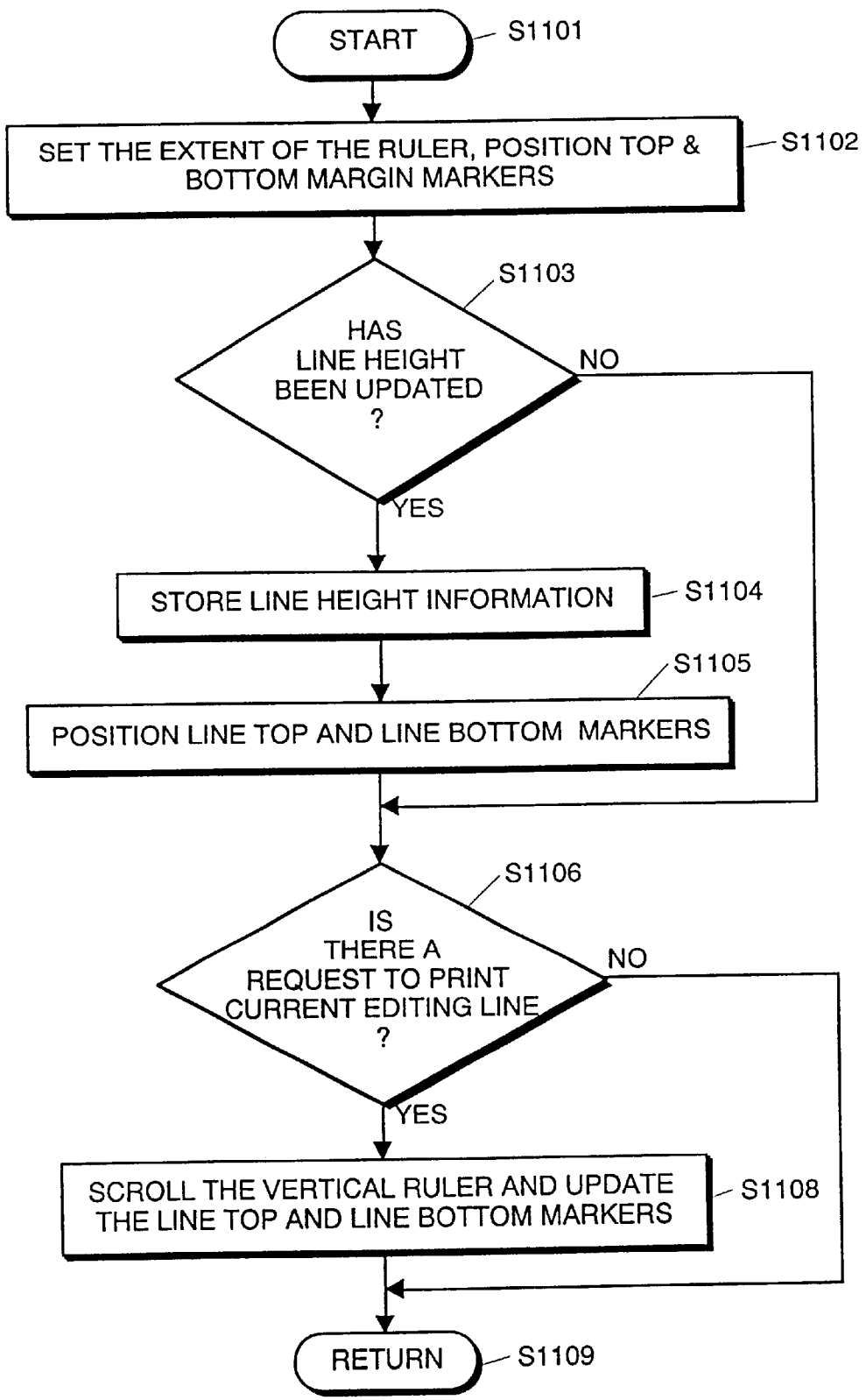
FIG. 11 is a flow diagram of the process steps for updating the height of the vertical ruler.

FIG. 11 is a flow diagram depicting the detailed steps of the process for updating the vertical ruler 32, as represented by steps S603 and S604 in FIG. 6. Beginning at a start state S1101, as controlled by vertical ruler controller 26 of CPU 10, flow proceeds to step S1102, where the vertical ruler controller 26 sets the limits of the ruler 32 based on the height of the paper inserted into the printer. As described earlier, the length of the ruler is detected by a paper-length sensor 8 or is preset by the operator, and stored in paper-length memory 21. At this juncture, the vertical ruler controller 26 also positions the top margin marker and the bottom margin marker. As described earlier, the positions of the top margin marker and the bottom margin marker may be preset or specified by the operator. Next, the process 1100 proceeds to decision step S1103, to examine if the value of the line height should be updated in accordance with a change in the font size of a keyed-in character. If so, flow proceeds to step S1104, where the vertical ruler controller 26 stores in font-size memory 22 the line height information, as described earlier. Flow then proceeds to step S1105, where the vertical ruler controller 26 positions the line top marker 40 and line bottom marker 41 representing the height of the edit line on the vertical ruler 32. Flow next proceeds to decision step S1106. If the line height or font size has not changed, flow proceeds directly to decision step S1106.

At decision step S1106, the vertical ruler controller 26 queries if there is a request to print the current editing line. If so, the vertical ruler controller 26 proceeds to step S1107, where the vertical ruler controller 26 scrolls the vertical ruler 32 in an amount equal to the line height of the printed line so as to present the next editing line. The vertical ruler controller 26 then repositions the top and bottom markers 40, 41. Flow then terminates at step S1109. If there is no request to print the current line, flow proceeds directly to terminate at step S1109.

Figure 12:
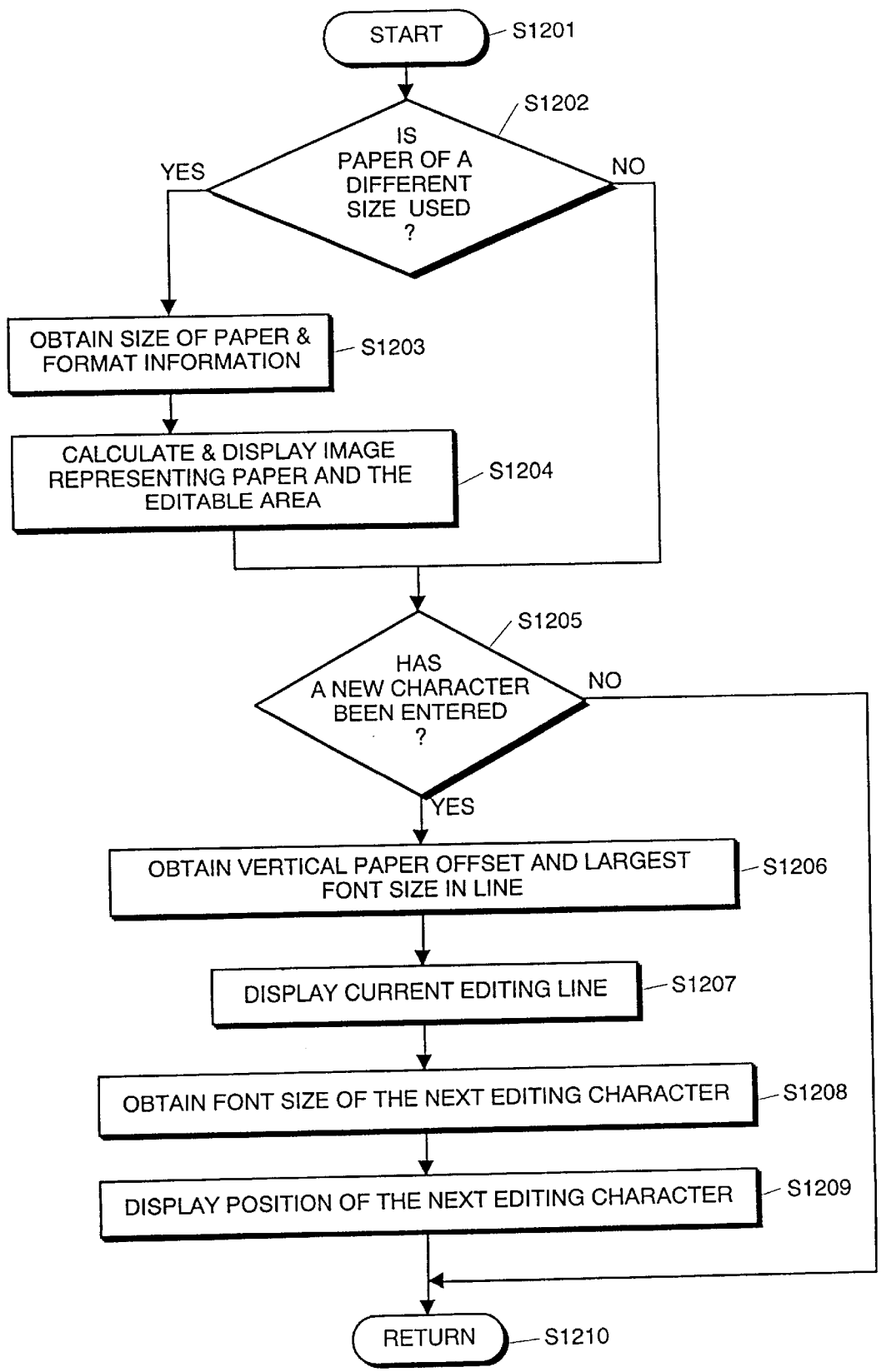
FIG. 12 is a flow diagram of the process steps for updating the size and format information of the scaled image of a recording medium.

FIG. 12 is a flow diagram depicting further detail of the process in step S608 for updating the scaled image 33. Beginning at a start state S1201, as controlled by the scaled image controller 29 of CPU 10, flow proceeds to decision step S1202, where the scaled image controller 29 queries if paper of a different size from a default value or from a previously inserted document is currently used. If so, flow proceeds to step S1203, where paper width and height information as well as format information, such as the positions of the left and right margins and the top and bottom margins, are obtained. In one embodiment, CPU 10 prompts the user to enter these values. In an alternate embodiment, a sensor (not shown) provides this information to the CPU 10, which in turn stores this information in page format memory 24. Flow then proceeds to step S1204, where the scaled image controller 29 scales and displays an image of the inserted paper or recording medium. The scaled image controller 29 scales and displays a dotted line 44a representing the editable area 44 where editing may be performed. Flow next proceeds to decision step S1205. If the same paper size as that previously inserted is used, or if the paper size is identical to a default value, flow proceeds directly to decision step S1205.

At decision step S1205, the scaled image controller 29 queries if a new character has been keyed in. If so, the process 1200 proceeds to obtain the vertical paper offset of the current editing line from the vertical ruler and obtains the height of the largest font size in the line. Flow then advances to step S1207, where the scaled image controller 29 scales and displays a highlighted area indicating the current editing line 45. Next, the process 1200 proceeds to step S1208, where the scaled image controller 29 obtains the font size and the width of the next editing character. Flow then moves on to step S1209, where the scaled image controller 29 scales and displays highlighted area 46 which indicates the location and width of the next character to be edited or keyed in. Flow then terminates at step S1210. If a new character has not been entered in decision step S1205, flow proceeds directly to step S1210, where the process is terminated.

The present invention thus provides a system which provides horizontal and vertical positional information of keyed-in characters, with respect to the paper selected for printing the characters, so that the location of the characters on the paper may be previewed prior to printing. The present invention further provides a display device which facilitates the display of characters of a variety of font sizes on a single line, including large font sizes, and which provides the operator with location information regarding the characters before they are printed. A scaled-down size reference document on the screen of a display device is also provided by the present invention, which supports line editing, to provide the operator of an electronic typewriter with an exact visual impression of the recording medium and location information of the keyed-in characters with respect to the recording medium.

Although this invention has been described in terms of a certain preferred embodiment, other embodiments apparent to those skilled in the art are also within the scope of this invention. Accordingly, the scope of the invention is intended to be defined only by the claims which follow.

What is claimed is:

1. An apparatus for providing a scalable edit window in which keyed-in characters may be previewed, the edit window having a width adjustable in accordance with a width of paper on which the characters will be printed, said apparatus comprising:

display means for displaying a scalable edit window in accordance with a stored window width, and for displaying at least one keyed-in character in the edit window, the character being displayed in the scalable edit window in a size and font type representative of the corresponding character to be printed;

determining means for determining if a paper width sensor is present;

means for storing a paper width value, said means for storing being operative to store a value sensed by a paper width sensor if said determining means determines such a sensor is present, and being operative to store a manually-entered paper width value if said determining means determines that a paper width sensor is not present;

comparing means for comparing the paper width value stored by said means for storing to a previously-stored window width;

replacing means for replacing the previously-stored window width with the paper width value if the paper width value is not the same as the previously-stored window width, so as to provide an updated window width; and adjusting means for adjusting the window width of the scalable edit window in accordance with the updated window width.

2. The apparatus of claim 1, wherein said apparatus further comprises a printing means and wherein said display means displays the scalable edit window in accordance with a maximum printing capability of said printing means.

3. The apparatus of claim 2, wherein the scalable edit window is scrollable in a horizontal direction.

4. An apparatus for providing a scalable window in which keyed-in characters may be previewed, the edit window having a width adjustable in accordance with a width of paper on which the characters will be printed, said apparatus comprising:

a display for displaying a scalable edit window and at least one keyed-in character;

a printer for printing the at least one keyed-in character;

a memory for storing the at least one keyed-in character to be printed, for storing width information of the scalable edit window and for storing instruction sequences by which the scalable edit window is processed; and a processor for executing the stored instruction sequences; wherein the stored instruction sequences include process steps to cause said processor to (a) display the scalable edit window in accordance with a stored window width and to display the at least one keyed-in character, the character being displayed in the scalable edit window in a size and font type representative of the corresponding character to be printed, (b) determine if a sensor for sensing paper is present, (c) store a paper width value sensed by the paper width sensor if the determining step determines that a sensor is present or to store a manually-entered paper width value if the sensor is determined not to be present, (d) compare the paper width value to a stored window width, (e) replace the stored window width with the paper width value if the paper width value is not the same as the stored window width, so as to provide an updated window width, (f) adjust the window width of the scalable window in accordance with the updated window width, and (g) print the at least one keyed-in character.

5. The apparatus of claim 4, wherein said apparatus further comprises a printing means and wherein the stored instruction sequences cause said processor to display the scalable edit window in accordance with a maximum printing capability of said printing means.

6. The apparatus of claim 5, wherein the scalable edit window is scrollable in a horizontal direction.

7. A method for providing a scalable edit window in which keyed-in characters may be previewed, the edit window having a width adjustable in accordance with a width of paper on which the characters will be printed, comprising the steps of:

displaying a scalable edit window in accordance with a stored window width, and at least one keyed-in character, the character being displayed in the scalable edit window in a size and font type representative of the corresponding character to be printed;

determining if a paper width sensor is present;

storing a paper width value if said determining step determines the presence of a sensor or manually entering a paper width value if said determining step determines that a sensor is not present;

comparing the paper width value to a previously-stored window width;

replacing the stored window width with the paper width value if the paper width value is not the same as the stored window width, so as to provide an updated window width;

adjusting the window width of the scalable edit window in accordance with the updated window width; and printing the at least one keyed-in character.

8. The method of claim 7, wherein said displaying step further displays the scalable edit window in accordance with a maximum printing capability of a printing means.

9. The method of claim 8, wherein the scalable edit window in said displaying step is scrollable in a horizontal direction.

10. Computer-executable process steps which provide a scalable edit window in which keyed-in characters may be previewed, the edit window having a width adjustable in accordance with a width of paper on which the characters will be printed, the process steps including:

a display step for displaying a scalable edit window in accordance with a stored window width, and for displaying at least one keyed-in character, the character being displayed in the scalable edit window in a size and font type representative of the corresponding character to be printed;

a determining step for determining if a paper width sensor is present;

a storing step for storing a paper width value if said determining step determines that a paper width sensor is present or for storing a manually-entered paper width value if a paper width sensor is not present;

a comparing step for comparing the paper width value to a previously-stored window width;

a replacing step for replacing the stored window width with the paper width value if the paper width value is not the same as the stored window width, so as to provide an updated window width;

an adjusting step for adjusting the window width of the scalable edit window in accordance with the updated window width; and a printing step for printing the at least one keyed-in character.

11. Computer-executable process steps of claim 10, wherein said display step further displays the scalable edit window in accordance with a maximum printing capability of a printing means.

12. Computer-executable process steps of claim 11, wherein the scalable edit window in said display step is scrollable in a horizontal direction.

13. An apparatus for providing position indicators for a scalable edit window in which keyed-in characters are displayed prior to printing on a recording medium, the position indicators for indicating the position of the edit window with respect to the recording medium, said apparatus comprising:

display means for displaying a scalable edit window in which keyed-in characters are displayed prior to printing on a recording medium, the display means further displaying a horizontal ruler and a vertical ruler for indicating the position of the edit window with respect to the recording medium, the horizontal ruler including a left margin marker and a right margin marker which respectively indicate the left and right margins designated for formatting on the recording medium, and the vertical ruler including a line top marker and a line bottom marker which respectively indicate a top and a bottom of the editing window;

first detecting means for detecting a width of paper selected for printing the keyed-in characters;

second detecting means for detecting a font size of the keyed-in characters;

third detecting means for detecting a maximum printing capability of the apparatus;

means for entering a length of paper selected for printing the keyed-in characters and for entering a left margin value and a right margin value;

first adjusting means for adjusting the length of the horizontal ruler in accordance with the detected width of paper or in accordance with the detected maximum printing capability of the apparatus, said first adjusting means also adjusting the position of the left margin marker and the right margin marker respectively in accordance with the left margin value and the right margin value;

second adjusting means for adjusting the length of the vertical ruler in accordance with the entered length of paper, said second adjusting means also adjusting the line top marker and the line bottom marker in accordance with the detected font size of the keyed-in characters; and a printing means for printing the keyed-in characters.

14. The apparatus of claim 13, wherein the display means further displays a scaled image of a recording medium in accordance with size information of the recording medium.

15. The apparatus of claim 14, wherein the display means further displays a visually highlighted area within the scaled image in accordance with position information indicative of pending print position of the keyed-in characters.

16. The apparatus of claim 15, wherein said horizontal ruler further includes a cursor marker which indicates a position of a next character to be keyed in.

17. The apparatus of claim 16, wherein the display means further displays a second visually highlighted area superimposed on the visually highlighted area, which represents the position and width of a next character to be keyed in.

18. The apparatus of claim 13, wherein the scalable edit window is scrollable in a vertical direction.

19. An apparatus for providing positional indicators for a scalable edit window in which keyed-in characters are displayed prior to printing on a recording medium, the position indicators for indicating the position of the edit window with respect to the recording medium, said apparatus comprising:

a display for displaying an edit window and at least one keyed-in character;

a keyboard for inputting the at least one keyed-in character;

a printer for printing the at least one keyed-in character;

a memory for storing the at least one keyed-in character to be printed, for storing location information of position indicators and for storing instruction sequences by which the position indicators are processed; and a processor for executing the stored instruction sequences;

wherein the stored instruction sequences include process steps to cause said processor to (a) display a scalable edit window in which the at least one keyed-in character is displayed prior to printing on a recording medium, to display position indicators for indicating the position of the edit window with respect to the recording medium, the position indicators including a horizontal ruler and a vertical ruler, the horizontal ruler comprising a left margin marker and a right margin marker which respectively indicate the left and right margins designated for formatting on the recording medium, the vertical ruler comprising a line top marker and a line bottom marker which respectively indicate a top and a bottom of the edit window, (b) detect a width of paper selected for printing the keyed-in characters inputted by said keyboard, (c) detect a font size of the keyed-in characters, (d) detect the maximum printing capability of the apparatus, (e) enter a length of paper selected for printing the keyed-in characters, (f) enter a left margin value and a right margin value, (g) adjust the length of the horizontal ruler in accordance with the detected width of paper or in accordance with the detected maximum printing capability of the apparatus, (h) adjust the position of the left margin marker and the right margin marker respectively in accordance with the left margin value and the right margin value, (i) adjust the length of the vertical ruler in accordance with the entered length of paper, (j) adjust the line top marker and the line bottom marker in accordance with the detected font size of the keyed-in characters, and (k) print the at least one keyed-in character.

20. The apparatus of claim 19, wherein the stored instruction sequences further include process steps to cause said processor to display a scaled image of a recording medium in accordance with size information of the recording medium.

21. The apparatus of claim 20, wherein the stored instruction sequences further include process steps to cause said processor to display a visually highlighted area within the scaled image in accordance with position information indicative of pending print position of the keyed-in characters.

22. The apparatus of claim 21, wherein said horizontal ruler further comprises a cursor marker which indicates a beginning position of a next character to be keyed in.

23. The apparatus of claim 22, wherein the stored instruction sequences further include process steps to cause said processor to display a second visually highlighted area superimposed on the visually highlighted area, which represents the position and width of a next character to be keyed in.

24. The apparatus of claim 19, wherein the stored instruction sequences further include process steps to cause said processor to scroll the scalable edit window in a vertical direction.

25. A method for providing position indicators for a scalable edit window in which keyed-in characters are displayed prior to printing on a recording medium, the position indicators for indicating the position of the edit window with respect to the recording medium, said method comprising the steps of:

displaying a scalable edit window in which keyed-in characters are displayed prior to printing on a recording medium, said displaying step further displaying position indicators for indicating the position of the edit window with respect to the recording medium, the position indicators including a horizontal ruler and a vertical ruler, the horizontal ruler comprising a left margin marker and a right margin marker which respectively indicate the left and right margins designated for formatting on the recording medium, the vertical ruler comprising a line top marker and a line bottom marker which respectively indicate a top and a bottom of the editing window;

a first detecting step of detecting a width of paper selected for printing the keyed-in characters;

a second detecting step of detecting a font size of the keyed-in characters;

a third detecting step of detecting the maximum printing capability of the apparatus;

a first entering step of entering a length of paper selected for printing the keyed-in characters;

a second entering step of entering a left margin value and a right margin value;

a first adjusting step of adjusting the length of the horizontal ruler in accordance with the detected width of paper or in accordance with the detected maximum printing capability of the apparatus, said first adjusting step further including adjusting the position of the left margin marker and the right margin marker respectively in accordance with the left margin value and the right margin value;

a second adjusting step of adjusting the length of the vertical ruler in accordance with the entered length of paper, said second adjusting step further including the step of adjusting the line top marker and the line bottom marker in accordance with the detected font size of the keyed-in characters; and printing the at least one keyed-in character.

26. The method of claim 25, wherein said displaying step further includes the step of displaying a scaled image of a recording medium in accordance with size information of the recording medium.

27. The method of claim 26, wherein said displaying step further includes the step of displaying a visually highlighted area within the scaled image in accordance with position information indicative of pending print position of the keyed-in characters.

28. The method of claim 27, wherein said horizontal ruler further comprises a cursor marker which indicates a beginning position of a next character to be keyed in.

29. The method of claim 28, wherein said displaying step further includes the step of displaying a second visually highlighted area superimposed on the visually highlighted area, which represents the position and width of a next character to be keyed in.

30. The method of claim 25, wherein the scalable edit window is scrollable in a vertical direction.

31. Computer-executable process steps which provide position indicators for a scalable edit window in which keyed-in characters are displayed prior to printing on a recording medium, the position indicators for indicating the position of the edit window with respect to the recording medium, the process steps including:

a displaying step for displaying a scalable edit window in which keyed-in characters are displayed prior to printing on a recording medium, the displaying step further including a step for displaying position indicators for indicating the position of the edit window with respect to the recording medium, the position indicators including a horizontal ruler and a vertical ruler, the horizontal ruler comprising a left margin marker and a right margin marker which respectively indicate the left and right margins designated for formatting on the recording medium, the vertical ruler comprising a line top marker and a line bottom marker which respectively indicate a top and a bottom of the editing window;

a first detecting step for detecting a width of paper selected for printing the keyed-in characters;

a second detecting step for detecting means also detecting a font size of the keyed-in characters;

a third detecting step for detecting the maximum printing capability of the apparatus;

a first inputting step for entering a length of paper selected for printing the keyed-in characters;

a second inputting step for entering a left margin value and a right margin value;

a first adjusting step for adjusting the length of the horizontal ruler in accordance with the detected width of paper or in accordance with the detected maximum printing capability of the apparatus, said first adjusting step further including the step of adjusting the position of the left margin marker and the right margin marker respectively in accordance with the left margin value and the right margin value;

a second adjusting step for adjusting the length of the vertical ruler in accordance with the entered length of paper, said second adjusting step including the step of adjusting the line top marker and the line bottom marker in accordance with the detected font size of the keyed-in characters; and a printing step for printing the keyed-in character.

32. The computer-executable process steps of claim 31, wherein said displaying step further displays a scaled image of a recording medium in accordance with size information of the recording medium.

33. The computer-executable process steps of claim 32, wherein said displaying step further displays a visually highlighted area within the scaled image in accordance with position information indicative of pending print position of the keyed-in characters.

34. The computer-executable process steps of claim 33, wherein said horizontal ruler in said displaying step further comprises a cursor marker which indicates a beginning position of a next character to be keyed in.

35. The computer-executable process steps of claim 34, wherein said displaying step further displays a second visually highlighted area superimposed on the visually highlighted area, which represents the position and width of a next character to be keyed in.

36. The computer-executable process steps of claim 31, wherein the scalable edit window in said displaying step is scrollable in a vertical direction.

37. An apparatus for displaying a scaled image of a recording medium on which is indicated a position for pending print operations, said apparatus comprising:

a first display area for displaying a line of keyed-in characters prior to printing on a recording medium;

a memory for storing size information for the recording medium and for storing position information indicative of the pending print position for the line of keyed-in characters displayed in said first display area; and a second display area for displaying a scaled image of the recording medium in accordance with the size information in said memory, and for visually highlighting, on the scaled image and in accordance with the position information in said memory, the pending print position of the line of keyed-in characters displayed in said first display area.

38. The apparatus of claim 37, wherein said first display area further displays a cursor indicative of the position for a next character to be keyed in, and wherein said second display area further displays a second visually highlighted area in accordance with location information indicative of the width of the next character to be keyed in, the second visually highlighted area being positioned at a position corresponding to the position of said cursor.

39. The apparatus of claim 37, wherein the keyed-in characters are displayed within a scalable edit window in said first display area, the scalable edit window being adjustable in accordance with a largest font size of the line of keyed-in characters along a vertical direction, and adjustable in accordance with a width of a recording medium.

40. The apparatus of claim 37, wherein said first display further displays a horizontal ruler and a vertical ruler, the horizontal ruler comprising a left margin marker and a right margin marker which respectively indicate the left and right margins designated for formatting on the recording medium, the vertical ruler comprising a page top margin and a page bottom margin which respectively indicate a top and a bottom margin of the recording medium, and wherein these margins are visually indicated in said scaled image in the second display area.

41. An apparatus for displaying a scaled image of a recording medium on which is indicated a position for pending print operation, said apparatus comprising:

keyboard for entering the at least one keyed-in character;

a memory for storing the at least one keyed-in character to be printed, for storing position information indicative of the pending print position for the line of keyed-in characters displayed on the first display area, for storing size information for the recording medium and for storing instruction sequences by which the scaled information processed;

a display means having a first display area for displaying a line of keyed-in characters prior to printing on a recording medium, said display means also having a second display area for displaying a scaled image of the recording medium in accordance with the size information in said memory, and for visually highlighting, on the scaled image and in accordance with the position information in said memory, the pending print position of the line of keyed-in characters displayed on said first display area; and a processor for executing the stored instruction sequences; wherein the stored instruction sequences include process steps to cause said processor to (a) display the line of keyed-in characters in a first display area prior to printing on a recording medium, (b) store in the memory, size information for the recording medium and to store in the memory, position information indicative of the pending print position for the line of keyed-in characters displayed, and (c) display in a second display area a scaled image of the recording medium in accordance with the size information in the memory, and for visually highlighting on the scaled image, and in accordance with the position information in the memory, the pending print position of the line of keyed-in characters displayed in the first display area.

42. The apparatus of claim 41, wherein the stored instruction sequences further include process steps to cause said processor to display in the first display area, a cursor indicative of the position for a next character to be keyed-in, and to display in the second display area, a second visually highlighted area superimposed on the initially highlighted area in accordance with location information indicative of the width of the next character to be keyed in, the second visually highlighted area being positioned at a position corresponding to the position of said cursor.

43. The apparatus of claim 41, wherein the stored instruction sequences further include process steps to cause said processor to display in the first display area, the keyed-in characters within a scalable edit window, the scalable edit window being adjustable in accordance with a largest font size of the keyed-in characters along a vertical direction, and adjustable in accordance with a width of a recording medium.

44. The apparatus of claim 41, wherein stored instruction sequences further include process steps to cause said processor to display in the first display area a horizontal ruler and a vertical ruler, the horizontal ruler comprising a left margin marker and a right margin marker which respectively indicate the left and right margins designated for formatting on the recording medium, the vertical ruler comprising a page top margin and a page bottom margin which respectively indicate a top and a bottom margin of the recording medium, and wherein these margins are visually indicated in the scaled image in the second display area.

45. A method for displaying a scaled image of a recording medium on which is indicated a position for pending print operations, comprising the step of:

displaying a line of keyed-in characters in a first display area prior to printing on a recording medium;

storing, in memory, size information for the recording medium and for storing position information indicative of the pending print position for the line of keyed-in characters displayed in the first display area; and displaying in a second display area, a scaled image of the recording medium in accordance with the size information in the memory, and for visually highlighting, on the scaled image and in accordance with the position information in the memory, the pending print position of the line of keyed-in characters displayed in said first display area.

46. The method of claim 45, wherein said first display area in said displaying step further displays a cursor indicative of the position of the next character to be keyed in, and wherein said second display further displays a second visually highlighted area superimposed on the initially highlighted area in accordance with location information indicative of the width of the next character to be keyed in, the second visually highlighted area being positioned at a position corresponding to the position of said cursor.

47. The method of claim 45, wherein the keyed-in characters in said displaying step are displayed within a scalable edit window in the first display area, the scalable edit window being adjustable in accordance with a largest font size of the line of keyed-in characters along a vertical direction, and adjustable in accordance with a width of a recording medium.

48. The method of claim 45, wherein said first display area in said displaying step further displays a horizontal ruler and a vertical ruler, the horizontal ruler comprising a left margin marker and a right margin marker which respectively indicate the left and right margins designated for formatting on the recording medium, the vertical ruler comprising a page top margin and a page bottom margin which respectively indicate a top and a bottom margin of the recording medium, and wherein these margins are visually indicated in the scaled image in the second display area.

49. Computer-executable process steps which display a scaled image of a recording medium on which is indicated a position for pending print operations, the process steps including:

a first displaying step for displaying a line of keyed-in characters in a first display area prior to printing on a recording medium;

a storing step for storing, in memory, size information for the recording medium and for storing position information indicative of the pending print position for the line of keyed-in characters displayed in said first display area; and a second displaying step for displaying, in a second display area, a scaled image of the recording medium in accordance with the size information in the memory, and for visually highlighting, on the scaled image and in accordance with the position information in the memory, the pending print position of the line of keyed-in characters displayed in the first display area.

50. The computer-executable process steps of claim 49, wherein said first displaying step further includes the step of displaying in the first display area, a cursor indicative of the position of a next character to be keyed in, and wherein said second displaying step includes the step of displaying in the second display area, a second visually highlighted area superimposed on the initially highlighted area in accordance with location information indicative of the width of the next character to be keyed in, the second visually highlighted area being positioned at a position corresponding to the position of said cursor.

51. The computer-executable process steps of claim 49, wherein the keyed-in characters in said first displaying step are displayed within a scalable edit window in the first display area, the scalable edit window being adjustable in accordance with a largest font size of the keyed-in characters along a vertical direction, and adjustable in accordance with a width of a recording medium.

52. The computer-executable process steps of claim 51, wherein said first displaying step further includes the step of displaying a horizontal ruler and a vertical ruler in the first display area, the horizontal ruler comprising a left margin marker and a right margin marker which respectively indicate the left and right margins designated for formatting on the recording medium, the vertical ruler comprising a page top margin and a page bottom margin which respectively indicate a top and a bottom margin of the recording medium, and wherein these margins are visually indicated in the scaled image in the second display area.

53. An apparatus for providing a scalable edit displayed area in which keyed-in characters may be viewed, the scalable edit area having a height adjustable in accordance with font size of the keyed-in characters, said apparatus comprising:

storing means for storing an area height;

display means for displaying a scalable edit area in accordance with the stored area height, and for displaying at least one keyed-in character in the scalable edit area, the character being displayed in the scalable edit area in a size and font type representative of the corresponding character to be printed;

comparing means for comparing a font size of the at least one keyed-in character to the stored area height;

replacing means for replacing the stored area height in said storing means with the font size of the at least one keyed-in character if the font size is larger than the stored area height, so as to provide an updated area height; and adjusting means for adjusting the height of the scalable edit area displayed by said display means in accordance with the updated area height.

54. The apparatus according to claim 53, wherein said display means is adapted to display second and subsequent keyed-in characters, the second character having a second font size; and said replacing means is adapted to replace the stored area height with the second font size if the second font size is larger than the stored area height.

55. An apparatus for providing a scalable edit area in which a keyed-in character may be viewed, the scalable edit area having a height adjustable in accordance with a font size of the keyed-in character, said apparatus comprising:

a display for displaying an edit area and at least one keyed-in character;

a keyboard for inputting the at least one keyed-in character;

a memory for storing at least one keyed-in character, height information of the scalable area, and instruction sequences by which the scalable area is processed; and a processor for executing the stored instructions sequences;

wherein the stored instruction sequences include process steps to cause said processor to (a) display the scalable edit area on the display in accordance with the stored height information, (b) display the at least one keyed-in character in the scalable edit area, the character being displayed in the scalable edit area in a size and font type representative of the corresponding character to be printed, (c) compare a font size of the at least one keyed-in character with the stored height information, (d) replace the stored height information in said memory with the font size if the font size is larger than the stored height information, to provide updated height information, and (e) adjust the area height of the scalable edit area in accordance with the updated height information.

56. The apparatus according to claim 55, wherein said display is adapted to display a second and subsequent characters in the scalable edit area, the second character having a second font size; said processor is adapted to replace the stored height information with the second font size if the second font size is larger than the stored height information.

57. A method for providing a scalable edit area in which keyed-in characters may be viewed, the scalable edit area having a height adjustable in accordance with font size of the keyed-in characters, the method comprising the steps of:

storing an area height;

displaying a scalable edit area in accordance with the stored area height;

displaying at least one keyed-in character in the scalable edit area, the character being displayed in the scalable edit area in a size and font type representative of the corresponding character to be printed;

comparing a font size of the at least one keyed-in character to the stored area height;

replacing the stored area height with the font size of the at least one keyed-in character if the font size is larger than the stored area height, so as to provide an updated area height; and adjusting the area height of the scalable edit area in accordance with the updated area height.

58. The method according to claim 57, wherein said displaying step further displays a second and subsequent characters in the scalable edit area, the second character having a second font size; and said replacing step replaces the stored area height with the second font size if the second font size is larger than the stored area height.

59. The method according to claim 58, further comprising a printing step for printing characters displayed in the scalable edit area, each character being printed in its corresponding size and font type.

60. The method according to claim 57, wherein the edit area also has a width adjustable in accordance with a width of paper on which the characters will be printed, the method further comprising the steps of:

determining if a paper width sensor is present;

storing a paper width value if the paper width sensor is determined to be present of manually entering a paper width value if the paper width sensor is determined not to be present;

comparing the paper width value to a stored area width;

replacing the stored area width with the paper width value if the paper width value is not equal to the stored area width, so as to provide an updated area width;

and adjusting the area width of the scalable edit area in accordance with the updated area width;

wherein the scalable edit area is displayed in accordance with the stored width.

61. The method according to claim 60, wherein the scalable edit area is displayed in accordance with a maximum printing capability of a printing means.

62. The method according to claim 61, wherein the scalable edit area is scrollable in a horizontal direction.

63. A computer-readable medium having computer-executable program steps stored thereon for providing a scalable edit area in which keyed-in characters may be viewed, the scalable edit area having a height adjustable in accordance with font size of the keyed-in characters, the computer-executable program steps comprising:

a storage step to store an area height;

a first display step to display a scalable edit area in accordance with the stored area height;

a second display step to display at least one keyed-in character in the scalable edit area, the character being displayed in the scalable edit area in a size and font type representative of the corresponding character to be printed;

a compare step to compare a font size of the at least one keyed-in character to the stored area height;

a replace step to replace the stored area height with the font size being larger than the stored area height, so as to provide an updated area height; and an adjustable step to adjust the area height of the scalable edit area in accordance with the updated area height.

64. A computer-readable medium according to claim 63, wherein the area height includes one character line height.

65. A computer-readable medium having computer-executable program steps stored thereon for providing a scalable edit area in which keyed-in characters may be viewed, the scalable edit area having a height adjustable in accordance with font size of the keyed-in characters, the computer executable program steps comprising:

a storage step to store an area height;

a compare step to compare a font size of the at least one keyed-in character to the stored area height;

a replace step to replace the stored area height with the font size being larger than the stored area height, so as to provide an updated area height; and an adjust step to adjust the area height of the scalable edit area i accordance with the updated area height.

66. A computer-readable medium according to claim 65, wherein the area height includes one character line height.

67. A computer-readable medium according to claim 65, further corn rising computer-executable program steps to display a scalable edit area in accordance with the stored area height.

68. A computer-readable medium according to claim 67, further comprising computer-executable program steps to display at least one keyed-in character in the scalable edit area, the character being displayed in the scalable edit area in a size and font type representative of the corresponding character to be printed.

* * * * *

UNITED STATES PATENT AND TRADEMARK OFFICE
CERTIFICATE OF CORRECTION

PATENT NO. : 6,411,315 B1
DATED : June 25, 2002
INVENTOR(S) : Young

It is certified that error appears in the above-identified patent and that said Letters Patent is hereby corrected as shown below:

Column 19,
Line 1, "keyboard" should read -- a keyboard --; and
Line 7, "information" should read -- information is --.

Column 22,
Line 52, "of" should read -- or --.

Column 24,
Line 13, "i" should read -- in --; and
Line 17, "corn rising" should read -- comprising --.

Signed and Sealed this

Fourth Day of February, 2003

JAMES E. ROGAN
*Director of the United States Patent and Trademark Office*